United States Patent [19]
Tanaka

[11] Patent Number: 4,575,198
[45] Date of Patent: Mar. 11, 1986

[54] LENS SYSTEM
[75] Inventor: Tsunefumi Tanaka, Kanagawa, Japan
[73] Assignee: Canon Kabushiki Kaisha, Tokyo, Japan
[21] Appl. No.: 476,624
[22] Filed: Mar. 18, 1983
[30] Foreign Application Priority Data
Mar. 30, 1982 [JP] Japan .................. 57-53540
[51] Int. Cl.⁴ .............................. G02B 9/62
[52] U.S. Cl. .................. 350/464; 350/454; 350/475
[58] Field of Search .............. 350/427, 464, 465, 475, 350/454

[56] References Cited
U.S. PATENT DOCUMENTS
2,645,156 7/1953 Tronnier ............................ 350/475
4,126,378 11/1978 Ogino ............................... 350/454
4,251,133 2/1981 Tsuji ................................. 350/464

FOREIGN PATENT DOCUMENTS
27108 8/1981 Japan .

Primary Examiner—John K. Corbin
Assistant Examiner—Paul M. Dzierzynski
Attorney, Agent, or Firm—Toren, McGeady, Stanger, Goldberg & Kiel

[57] ABSTRACT

A lens system having three lens groups, or, from front to rear, a 1st lens group having a positive refractive power, a 2nd lens group having a negative refractive power, and a 3rd lens group having a positive refractive power, whereby a proper optical arrangement for said 1st, 2nd and 3rd lens groups and proper rules of design for each lens group are set forth and the aforesaid 3rd lens group is made movable for focusing, to thereby achieve good correction of aberrations.

10 Claims, 11 Drawing Figures

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

LENS SYSTEM

BACKGROUND OF THE INVENTION

1. Field of the Invention

This invention relates to lens systems, and more particularly, to lens systems having a focusing provision in the lens group at the rear part thereof, or employing the so-called rear focusing method.

2. Description of the Prior Art

In the past, for preforming focusing, there have been made proposals such as those for moving only one lens group of the rear part of a lens system, or the so-called rear focusing method, or for moving a central lens group of a lens system, or the so-called inner focusing method.

These focusing methods are suited for making the lens system more compact, and also provide the advantage that the focusing operation can be easily performed.

On the other hand, the use of only the rear part of the lens system in focusing generally results in deteriorating the image quality. To avoid this, therefore, it has been the prior art practice that the focusing lens group is divided into two parts which are moved at different speeds from each other to effect focusing, or the so-called floating method is employed, or that the diaphragm mechanism is made to move together with the lens group when focusing. However, such focusing methods generally have a disadvantage that the structure of the lens mounting becomes complicated. Particularly in the application of the rear focusing method to lens systems having focal lengths of from 100 mm to 200 mm for 35 mm format, or so-called semi-telephoto lenses, it was observed in many cases that the tendency of image quality loss was increased.

Reference is made to lens systems having a plurality of lens groups and having the focusing provision besides the front or 1st lens group, or employing the rear focusing method and the inner focusing method, such as those disclosed in U.S. Pat. Nos. 3,408,135, 3,854,797, 4,310,211 and 4,348,084 and Japanese Laid-Open Patent No. Sho 56-27108.

SUMMARY OF THE INVENTION

The present invention has for its object the provision of a lens system employing a focusing method contributes to simplification of the structure of a mounting mechanism therefor and an improvement in the compactness, while still permitting an image of good quality to be formed. To achieve this, one of the features of the invention is that the lens system comprises, from front to rear, a 1st lens group having a positive refractive power, a 2nd lens group having a negative refractive power, and a 3rd lens group having a positive refractive power, whereby as focusing is performed to suit to different object distances by axially moving the 3rd lens group, the optical arrangement when focused on an infinitely distant object is made to satisfy the following inequalities of condition:

$$0.4 < l1/l2 < 1.5$$

where $l1$ is the axial air separation between the 1st and 2nd lens groups and $l2$ is the axial air separation between the 2nd and 3rd lens groups.

BRIEF DESCRIPTION OF THE DRAWINGS

FIGS. 3-1 through -3, 4-1 through -3 and 5-1 through -3 are graphic representations of the various aberrations of the 1st to 3rd specific lens systems of the invention at 0.2 magnification.

DETAILED DESCRIPTION OF THE PREFERRED EMBODIMENTS

Figure 1:
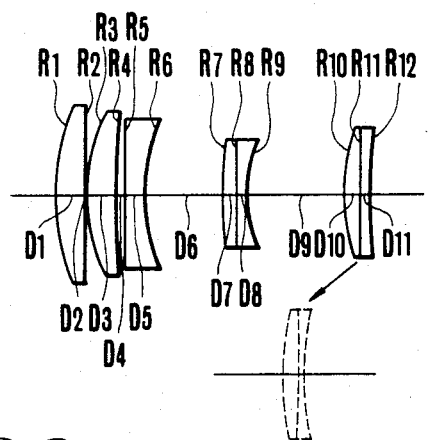
FIGS. 1 and 2 are lens block diagrams of 1st and 3rd specific lens systems of the invention respectively each in two different focusing positions.
Figure 2:
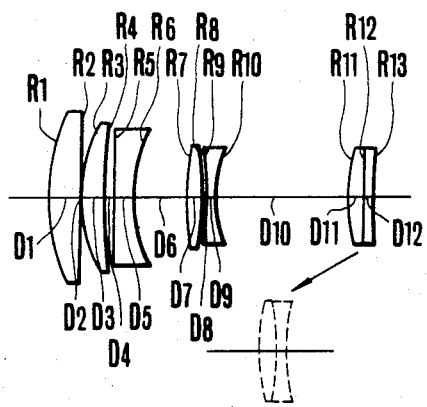
Figures 1, 3:
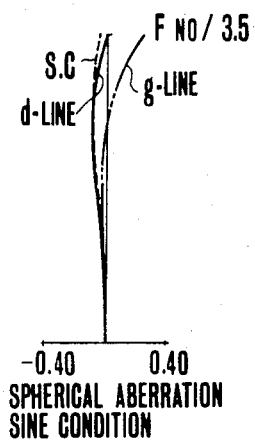
Figures 2, 3:
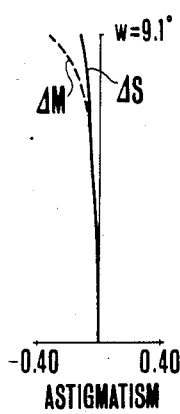
Figure 3:
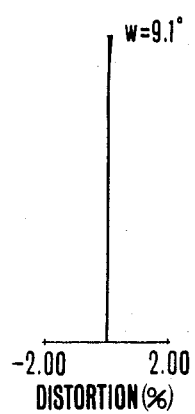
Figures 1, 4:
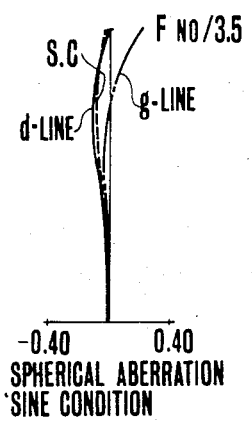
Figures 2, 4:
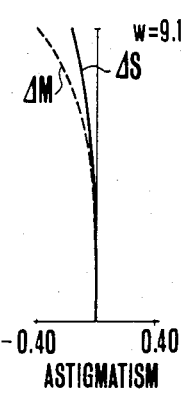
Figures 3, 4:
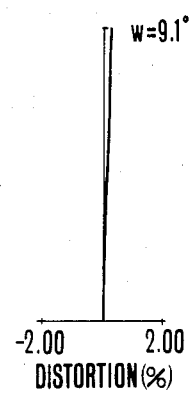
Figures 1, 5:
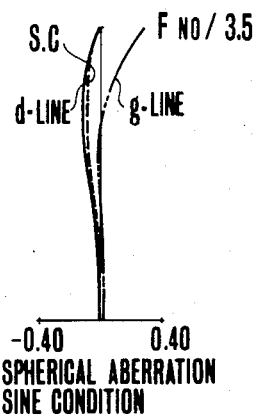
Figures 2, 5:
Figures 3, 5:
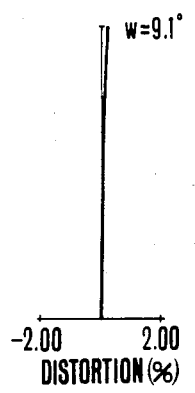

The lens system of the invention comprises 1st, 2nd and 3rd lens groups of positive, negative and positive refractive powers respectively arranged in this order from the front, whereby the axial air separations l1 and l2 between the 1st lens group and the 2nd lens group and between the 2nd lens group and 3rd lens group respectively are properly set forth, and the 3rd lens group is made movable for focusing.

And the l1 and l2 are chosen so as to achieve good correction of aberrations and so that the total length of the lens system becomes good in proportion, and the lens form is determined so as to create a proper space in which the focusing lens group moves.

When the value of l1/l2 becomes equal to or smaller than the aforesaid lower limit, namely, 0.4, the total length of the lens becomes objectionably long. When the value of l1/l2 becomes equal to or larger than 1.5, the positive refractive power of the 3rd lens group must be strengthened with the result that large spherical aberration and astigmatism are produced by the focusing lens group. These aberrations are difficult to correct well.

According to the focusing method of the lens system of the invention described above, an image well corrected for aberrations over the entire focusing range can be obtained.

The focusing method of the lens system according to the present invention provides accomplishment of the object thereof when the above-stated conditions are satisfied. To achieve a further improvement of image aberrations, however, it is preferred to satisfy the following conditions:

$$-1 < f/f2 < 0 \quad (1)$$

where f is the focal length of the entire lens system and f2 is the focal length of the 2nd lens group.

As the negative refractive power of the 2nd lens group is increased, when the lower limit of inequalities of condition (1) is exceeded, the divergency of the light bundles arriving at the 3rd lens group becomes large so that aberrations and particularly coma are difficult to correct, and also the total length of the lens system is objectionably increased.

On the other hand, when the refractive power of the 2nd lens group is changed from negative to positive, it becomes difficult for the Petzval sum to take an appropriate value, and further variation with focusing of the chromatic aberration becomes objectionably large.

With the focusing method of the lens system according to the present invention, good correction of aberrations is required to be stabilized against focusing. For this purpose, it is preferred to construct the 1st lens group from at least three lens elements of which the 1st counting from front is positive, the 2nd is positive and the 3rd is negative.

Also with regard to the 2nd lens group, it is preferred that at least one positive lens P2 and at least one negative lens Q2 are included, that, of these, the positive lens P2 and the negative lens Q2 satisfy the following inequalities of condition for the refractive indices of the glasses thereof, n2 and n2', respectively:

$$0.15 < |n2 - n2'| < 0.28 \qquad (2)$$

and that, for the spherical aberration to vary to as small an extent as possible, and rear surface of the positive lens P2 and the front surface of the negative lens Q2 both turn their convex curvatures toward the rear.

By satisfying the inequalities of condition (2), the spherical aberration and the astigmatism can be well stabilized over the entire focusing range. When either of the upper and lower limits of condition (2) is exceeded, the amount of aberrations varies to large extent as the object distance varies, and this correction becomes difficult.

It is also preferred that the 3rd lens group is in the form of a cemented lens of a positive lens element P3 and a negative lens element Q3 in this order from front, that, letting the refractive indices an Abbe numbers of the glasses of these lens elements be denoted by n3, n3', $\nu 3$ and $\nu 3'$ respectively, the following inequalities of condition are satisfied:

$$-0.07 < n3 - n3' < 0.07 \qquad (3)$$

$$15.5 < \nu 3 - \nu 3' < 32.0 \qquad (4)$$

and that the cemented surface is convex toward the rear.

The 3rd lens group functions as a lens group movable for focusing purposes. On this account, the cemented form of the positive lens P3 and the negative lens Q3 in this order from front is taken, and the cemented surface is directed toward the rear, thereby giving an advantage that within the 3rd lens group, production of spherical aberration and coma can be as suppressed as possible.

By the choice of glasses satisfying the inequalities of conditions (3) and (4), longitudinal chromatic aberration and pupil chromatic aberration can be very well minimized. By setting forth such rules of design for the 3rd lens group, despite the 3rd lens group moves to effect focusing, because all those of the aberrations such as spherical aberration coma and chromatic aberrations which are produced from only the 3rd lens group are small, it is made possible to minimize the amount of image aberrations of the entire lens system. The use of the lens configuration that the focusing provision is made in only one lens group, in this instance, the 3rd lens group, has another advantage that the structure of the mechanical lens mounting can be simplified.

Upon combination of the 3rd lens group of such form with the 2nd lens group of such form, it becomes easy to achieve good stability of all aberrations throughout a range of object distances from infinity to the closest.

A great advantage can be expected from the application of the focusing method of the invention to relatively wide angle lens system which employ techniques related to the conventional rear focus method.

Examples of specific lens systems of the invention can be constructed in accordance with the numerical data given in the following tables for the radii of curvature, R, the axial thicknesses or air separations, D, and the refractive indices, N, and the Abbe numbers, $\nu$, of the glasses of the various lens elements with subscripts numbered consecutively from front to rear.

It should be noted that the 1st and 2nd specific examples have the 2nd lens group in the cemented form, and the 3rd example is in the separated form of two lens elements, and that the cemented surface, and the confronting surfaces of the 3rd example with an air space intervening therebetween, are all directed toward the rear.

EXAMPLE 1

| F = 100 | F No. 1:3.5 | $2\omega = 18.2°$ | |
|---|---|---|---|
| R1 = 37.14 | D1 = 5.24 | N1 = 1.55963 | $\nu 1$ = 61.2 |
| R2 = −1288.47 | R2 = 0.30 | | |
| R3 = 32.11 | D3 = 4.88 | N2 = 1.60311 | $\nu 2$ = 60.7 |
| R4 = 179.96 | D4 = 1.59 | | |
| R5 = −693.68 | D5 = 3.18 | N3 = 1.69895 | $\nu 3$ = 30.1 |
| R6 = 27.82 | D6 = 13.88 | | |
| R7 = 92.32 | D7 = 2.37 | N4 = 1.76182 | $\nu 4$ = 26.6 |
| R8 = −170.71 | D8 = 1.73 | N5 = 1.51633 | $\nu 5$ = 64.1 |
| R9 = 23.36 | D9 = 22.97 | | |
| R10 = 40.03 | D10 = 2.78 | N6 = 1.69680 | $\nu 6$ = 55.5 |
| R11 = −228.66 | D11 = 1.35 | N7 = 1.67270 | $\nu 7$ = 32.1 |
| R12 = 106.92 | | | |

EXAMPLE 2

| F = 100 | F No. 1:3.5 | $2\omega = 18.2°$ | |
|---|---|---|---|
| R1 = 37.140 | D1 = 5.32 | N1 = 1.62299 | $\nu 1$ = 58.2 |
| R2 = −2997.177 | D2 = 0.37 | | |
| R3 = 31.878 | D3 = 4.49 | N2 = 1.60311 | $\nu 2$ = 60.7 |
| R4 = 177.799 | D4 = 1.58 | | |
| R5 = −733.248 | D5 = 3.18 | N3 = 1.72825 | $\nu 3$ = 28.5 |
| R6 = 28.834 | D6 = 9.78 | | |
| R7 = 106.805 | D7 = 2.22 | N4 = 1.76182 | $\nu 4$ = 26.6 |
| R8 = −176.207 | D8 = 1.51 | N5 = 1.51633 | $\nu 5$ = 64.1 |
| R9 = 23.194 | D9 = 21.44 | | |
| R10 = 47.673 | D10 = 2.76 | N6 = 1.65844 | $\nu 6$ = 50.9 |
| R11 = −116.207 | D11 = 1.48 | N7 = 1.64769 | $\nu 7$ = 33.8 |
| R12 = 194.553 | | | |

EXAMPLE 3

| F = 100 | F No. 1:3.5 | $2\omega = 18.2°$ | |
|---|---|---|---|
| R1 = 37.265 | D1 = 5.30 | N1 = 1.62299 | $\nu 1$ = 58.2 |
| R2 = −2879.262 | D2 = 0.37 | | |
| R3 = 30.829 | D3 = 4.09 | N2 = 1.60311 | $\nu 2$ = 60.7 |
| R4 = 177.016 | D4 = 1.60 | | |
| R5 = −680.083 | D5 = 3.18 | N3 = 1.72825 | $\nu 3$ = 28.5 |
| R6 = 28.147 | D6 = 9.92 | | |
| R7 = 138.854 | D7 = 2.22 | N4 = 1.76182 | $\nu 4$ = 26.6 |
| R8 = −121.378 | D8 = 0.68 | | |
| R9 = −158.891 | D9 = 1.44 | N5 = 1.51633 | $\nu 5$ = 64.1 |
| R10 = 22.969 | D10 = 23.70 | | |
| R11 = 48.312 | D11 = 2.76 | N6 = 1.65844 | $\nu 6$ = 50.9 |
| R12 = −204.207 | D12 = 1.48 | N7 = 1.64769 | $\nu 7$ = 33.8 |
| R13 = 197.233 | | | |

What I claim:

1. A lens system comprising:
   three lens groups, said three lens groups being, from front to rear, a 1st lens group having a positive refractive power, a 2nd lens group having a negative refractive power and a 3rd lens group having a positive refractive power, wherein focusing is performed by moving said 3rd lens group,
   said lens system, when focused on an infinitely distant object, satisfies the relationship $$0.4 < l1/l2 < 1.5$$

where l1 is the air separation between said 1st lens group and said 2nd lens group, and l2 is the air separation between said 2nd lens group and said 3rd lens group, wherein said 2nd lens group has at least one positive lens and at least one negative lens, and wherein said lens system satisfies the relationship $$0.15 < |n2 - n2'| < 0.28$$

where n2 and n2' are the refractive indices of the glasses of said positive lens and said negative lens respectively.

2. A lens system according to claim 1, satisfying $$-1 < f/f2 < 0$$

where f is the focal length of said lens system, and f2 is the focal length of said 2nd lens group.

3. A lens system according to claim 2, wherein said 1st lens group has, from front to rear, three lenses of positive, positive and negative refractive powers.

4. A lens system according to claim 1, wherein said 3rd lens group has a cemented lens of a lens of positive refractive power and a lens of negative power cemented together, and wherein the cemented surface of said cemented lens is convex toward the rear.

5. A lens system according to claim 4, satisfying:

$$-0.07 < n3 - n3' < 0.07$$

$$15.5 < \nu3 - \nu3' < 32.0$$

wherein n3, n3', $\nu3$ and $\nu3'$ are the refractive indices and Abbe numbers of the glasses of said lens of positive refractive power and said lens of negative refractive power respectively.

6. A telephoto-lens, comprising:

a fixed first lens unit including a plurality of lenses and having positive power;

a fixed second lens unit with negative power which is positioned at an image side of said first lens unit and includes a positive lens and a negative lens, further has convex frontmost lens surface facing toward an object side; and a third lens unit with positive power which is positioned at an image side of said second lens unit and moves along the optical axis for focusing of the telephoto-lens;

wherein when an axial air separation between the first lens unit and the second lens unit is expressed by l1, and an axial air separation between the second lens unit and the third lens unit is expressed by l2 as the telephoto-lens is focused on an infinite position, the following condition is satisfied:

$$0.4 < l1/l2 < 1.5.$$

7. A telephoto-lens according to claim 6, wherein when a refractive power of a positive lens of the second lens unit is expressed by n2, and refractive power of a negative lens of said second lens unit is expressed by n2', the following condition is satisfied:

$$0.15 < |n2 - n2'| < 0.28.$$

8. A telephoto-lens according to claim 7, wherein said positive lens and said negative lens are positioned in order, and an image side lens surface of the positive lens is convex toward the image side, while an object side lens surface of the negative lens is concave toward the object side.

9. A telephoto-lens according to claim 6, wherein an entire focal length of said telephoto-lens is expressed by f, and a focal length of the second lens unit is expressed by f2, the following condition is satisfied:

$$-1 < f/f2 < 0.$$

10. A telephoto-lens according to claim 6, wherein the third lens unit has a positive lens and a negative lens, and when a refractive index and an Abbe number of lens material of said positive lens are expressed respectively by n3', $\nu3$, while a refractive index and an Abbe number of lens material of said negative lens are expressed respectively by n3', $\nu3'$, the following condition is satisfied:

$$-0.07 < n3 - n3' < 0.07$$

$$15.5 < \nu3 - \nu3' < 32.0.$$

* * * * *